US006853616B1

United States Patent
Kim et al.

(10) Patent No.: US 6,853,616 B1
(45) Date of Patent: Feb. 8, 2005

(54) ORTHOGONAL FREQUENCY DIVISION MULTIPLEXING RECEIVER WHERE FFT WINDOW POSITION RECOVERY INTERLOCKS WITH SAMPLING CLOCK ADJUSTMENT AND METHOD THEREOF

(75) Inventors: Dong-kyu Kim, Suwon (KR); Sang-hyun Do, Suwon (KR); Hyung-jin Choi, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/555,046

(22) PCT Filed: Nov. 24, 1998

(86) PCT No.: PCT/KR98/00376

§ 371 (c)(1),
(2), (4) Date: Aug. 11, 2000

(87) PCT Pub. No.: WO99/27671

PCT Pub. Date: Jun. 3, 1999

(30) Foreign Application Priority Data

Nov. 25, 1997 (KR) ............................................ 97-62690

(51) Int. Cl.[7] .............................................. H04J 11/00
(52) U.S. Cl. ...................... 370/210; 375/147; 375/260; 375/136
(58) Field of Search ................................. 370/203–210, 370/526, 527; 375/135–136, 146–150, 243–244, 260–261, 222, 355, 362–365

(56) References Cited

U.S. PATENT DOCUMENTS 5,867,478 A * 2/1999 Baum et al. ................. 370/203
6,122,246 A * 9/2000 Marchok et al. ............ 370/208

OTHER PUBLICATIONS

L. Litwin and M. Pugel. "The principles of OFDM", http://rfdesign.com/, Jan. 1, 2001, pp. 30–48.*
H. Zou, B. McNair, and B. Daneshard, "An Intergrated OFDM Receiver for High–Speed Mobile Data Communications", http://www.novidesic.com/pubs/globecom01_final3.pdf; Oct. 2001.*

* cited by examiner

*Primary Examiner*—Chi Pham
*Assistant Examiner*—Hoang Thai
(74) *Attorney, Agent, or Firm*—Sughrue Mion, PLLC

(57) ABSTRACT

An OFDM receiver for interlocking FFT window position recovery with sampling clock control, and a method thereof are provided. This method includes the steps of: extracting a pilot signal from fast-Fourier-transformed OFDM received signals, and detecting inter-pilot phase differences; averaging the detected phase differences for a symbol and normalizing the mean phase difference by dividing it into reference values corresponding to phase differences generated when FFT window errors of at least one sample exist; and simultaneously controlling the FFT window position offset using a value obtained by rounding off the normalized value, and the sampling clock offset using the difference between the round-off value and the normalized value.

8 Claims, 4 Drawing Sheets

ORTHOGONAL FREQUENCY DIVISION MULTIPLEXING RECEIVER WHERE FFT WINDOW POSITION RECOVERY INTERLOCKS WITH SAMPLING CLOCK ADJUSTMENT AND METHOD THEREOF

BACKGROUND OF THE INVENTION

1. Field of the Invention

The present invention relates to an orthogonal frequency division multiplexing (OFDM) receiver and a method thereof, and more particularly, to an OFDM receiver for interlocking FFT window position recovery with sampling clock control for controlling an analog-to-digital converter, and a method thereof.

2. Description of the Related Art

Generally, time synchronization and frequency synchronization must be accurately performed to allow a receiver to recover an OFDM signal for European ten digital broadcasts transmitted from a transmitter. Time synchronization consists of FFT window position recovery for accurate parallel processing of signals, and was sampling clock recovery for controlling a sampling clock of an analog-to-digital converter (ADC) for sampling a signal having a maximum signal-to-noise ratio (SNR) among received signals. Frequency synchronization means that the radio frequency (RF) oscillation frequency of a receiver is synchronized with the oscillation frequency of a transmitter.

FIG. 1 is a block diagram of a portion for carrying out FFT window position recovery and sampling clock control in a general OFDM system receiver.

When the number of bins of FFT is N, the symbol of an OFDM signal is comprised of a useful data interval having N useful data samples being the outputs of an inverse fast Fourier transform (IFFT), and a guard interval having G sample lengths to be inserted between symbols to prevent inter-symbol interference. The guard interval copies the end portion of the useful data interval. A transmitter (not shown) sequentially transmits a symbol consisting of G+N samples being the sum of N complex values and G complex values output by the IFFT.

An i-th symbol comprised of complex values output by an FFT is expressed by the following Equation 1:

$$s_l = \sum_{n=-G}^{N-1} x_{l,n} = \sum_{n=-G}^{-1}\sum_{k=0}^{N-1} X_{l,k} e^{j2\pi(N+n)/N} + \sum_{n=0}^{N-1}\sum_{k=0}^{N-1} X_{l,k} e^{j2\pi kn/N} \quad (1)$$

wherein l is a symbol number, k is a carrier index (number), N is the number of useful data samples, and n represents sampling time. The first term of the second expression of Equation 1 represents a guard interval, and the second term represents a useful data interval.

As shown in FIG. 1, an ADC 110 samples a received OFDM signal. An FFT window 120 is controlled by an FFT window controller 180 to recover an FFT window position, and removes the guard interval of the first term of Equation 1 and then sequentially transmits the second term to the FFT 130. A phase difference calculator 150 calculates a phase difference between two pilots extracted by a pilot extractor 140 for one symbol. An FFT window offset detector 160 detects the position of the FFT window by the phase difference output by the phase difference calculator 150. The FFT window controller 180 controls the position of the FFT window by the FFT window offset. When FFT window position recovery is not carried out well, the received signal cannot be accurately recovered since sampling clock control is also not carried out well. Hence, the sampling clock control starts after FFT window position recovery by the FFT window controller 180 is completed. In other words, the phase difference calculator 150 calculates phase differences between pilots extracted between current and previous symbols by the pilot extractor 140 after the FFT window position recovery is completed. A sampling clock offset detector 170 detects sampling offsets using the phase difference output by the phase difference calculator 150. A phase-locked loop (PLL) 190 controls the sampling clocks of the ADC 110 according to input sampling clock offsets. If the sampling clocks are not controlled, the receiver is not sampled into a total of (N+G) samples for one symbol but sampled into (N+G+1) or (N+G−1) samples because of a sampling clock difference between the receiver and transmitter, resulting in a sample stuff-rob phenomenon. As a consequence, a next symbol start point is preceded or delayed by one sample. Therefore, the apparatus of FIG. 1 controls sampling clock errors after accurate FFT window position recovery is carried out, and thus the sample stuff-rob phenomenon is generated while FFT position recovery is performed.

SUMMARY OF THE INVENTION

It is an object of the present invention to provide an OFDM receiver for simultaneously carrying out FFT window position recovery and sampling clock control using a detected phase difference between two pilots in one symbol period, and a method thereof.

To accomplish the above object, there is provided a method of interlocking FFT window position recovery with sampling clock control in symbol units in an orthogonal frequency division multiplexing (OFDM) receiver for receiving an OFDM symbol consisting of a useful data interval and a guard interval, the method including the steps of: (a) extracting a pilot signal from fast-Fourier-transformed OFDM received signals, and detecting inter-pilot phase differences; (b) averaging phase differences detected in step (a) for a symbol and normalizing the mean phase difference by dividing it into reference values corresponding to phase differences generated when FFT window errors of at least one sample exist; and (c) simultaneously controlling the FFT window position offset using a value obtained by rounding off the normalized value of the step (b), and the sampling clock offset using the difference between the round-off value and the normalized value.

To accomplish the above object, there is provided an OFDM receiver for interlocking FFT window position recovery with sampling clock control by receiving an OFDM symbol consisting of a useful data interval and a guard interval, the apparatus including: an analog-to-digital converter (ADC) for converting an OFDM signal into digital complex samples; an FFT window for removing the guard interval from the digital complex samples output by the ADC and outputting useful data samples; an FFT for fast-Fourier-transforming the samples output by the FFT window; a phase difference calculator for calculating phase differences between two values among the complex values received via a plurality of pilots from the FFT, averaging these phase differences for one symbol, and normalizing the mean value by dividing it into predetermined reference values; an FFT window controller for rounding off the normalized value output by the phase difference calculator and controlling the window position of the FFT window; and a phase synchronous loop for controlling the sampling clock signals of the ADC using the difference between the round-off value and the normalized value.

BRIEF DESCRIPTION OF THE DRAWINGS

The above object and advantage of the present invention will become more apparent by describing in detail a preferred embodiment thereof with reference to the attached drawings in which.

DESCRIPTION OF THE PREFERRED EMBODIMENT

Figure 1:
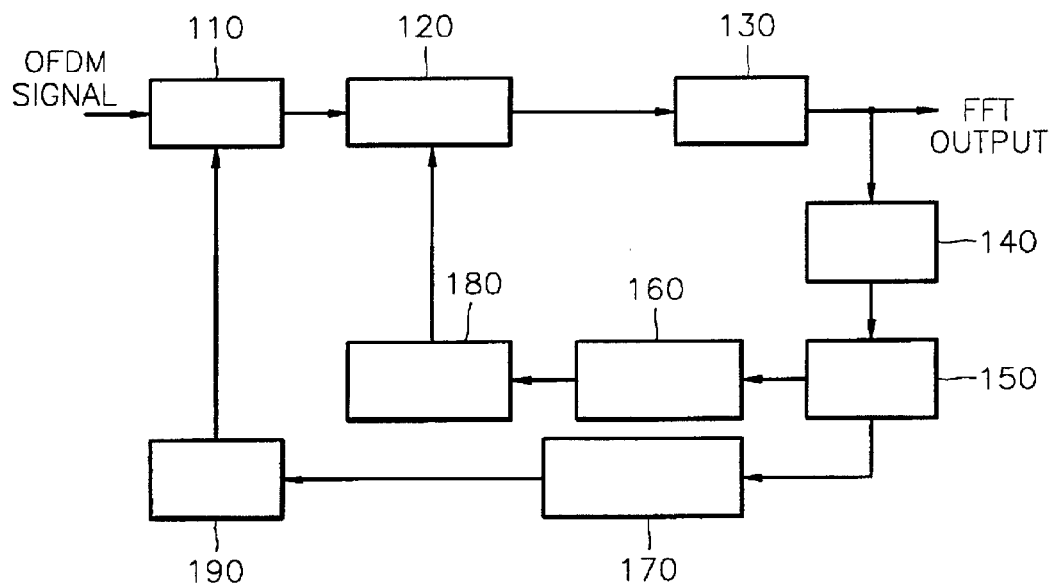
FIG. 1 is a block diagram showing the configuration of a general OFDM system receiver.
Figure 2:
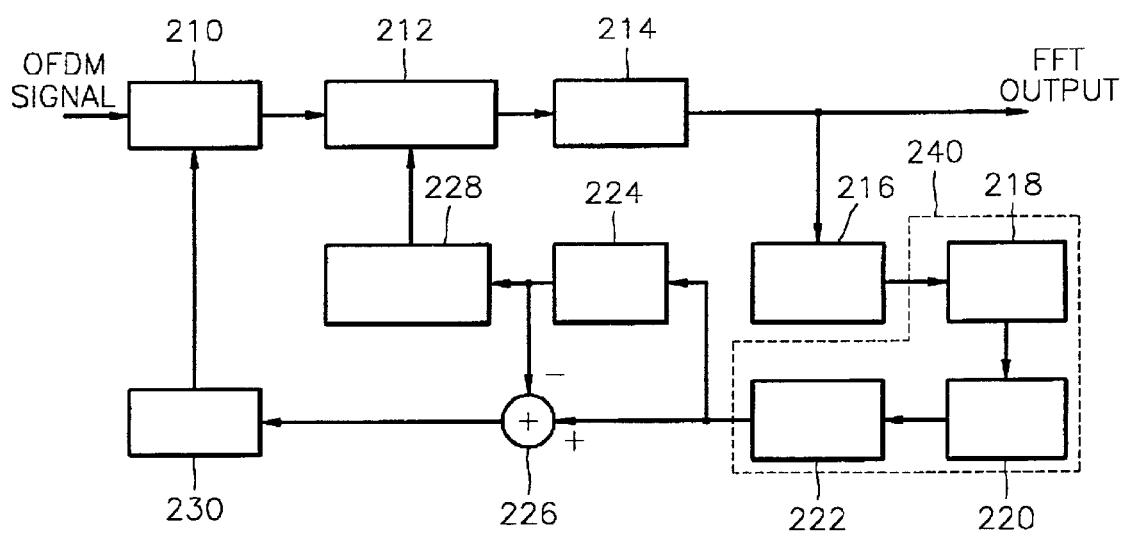
FIG. 2 is a block diagram of an OFDM receiver for interlocking FFT window position recovery with sampling clock control, according to the present invention.

Referring to FIG. 2, an ADC 210 converts a received OFDM signal into a digital complex sample. An FFT window 212 removes a guard interval from the input digital complex sample and then sequentially outputs N sample values to an FFT 214. The FFT 214 fast-Fourier-transforms the input N sample values.

A pilot extractor 216 extracts complex values transmitted via pilots, among the outputs of the FFT 214. The pilots are specific subcarriers that are used when a transmitter transmits known values for synchronization of the receiver and transmitter in an OFDM system. In general, the OFDM system receiver is used for synchronization by using the complex values transmitted via the pilots among the outputs of the FFT.

A phase calculator 240 includes a phase difference detector 218 a mean calculator 220, and a normalizer 222. The phase difference detector 218 detects a phase difference between a pair of pilots for one symbol. The mean calculator 220 averages the phase differences with respect to a plurality of pilot pairs. The normalizer 222 normalizes the mean value by dividing it into reference values corresponding to the volumes of phase changes occurring when an FFT window error of one sample exists. A normalized phase variation $T_i$ calculated by the phase calculator 240 is expressed by the following Equation 2:

$$\hat{T}_l = \frac{\frac{1}{2\pi}}{N} \frac{1}{L} \sum_{n=1}^{l} \frac{\Delta\phi_{l,k_{n+1},n}}{k_{n+1} - k_n} \qquad (2)$$

wherein N is the number of useful data samples, L is the number of used pilots, k is a subcarrier number, $k_{n+1}-k_n$ is a frequency spacing between two pilot carriers, and $\Delta\phi_{l,k_{n+1},n}$ is a phase difference between pilots for a i-th symbol.

The phase calculator 240 will now be described in more detail. The phase difference detector 218 detects a phase difference between the pilot pair extracted by the pilot extractor 216. Phase difference detection changes according to the method of allocating known complex values between the transmitter and receiver transmitted via pilots. The phase difference detector according to a first method comprises a phase detector (not shown) for detecting the phases of input complex values when an identical complex value is allocated to each pilot independently of symbols and pilots, and a subtractor (not shown) for obtaining the difference between the phases calculated from the received complex values of two pilots. The phase difference detector according to a second method comprises a phase detector (not shown) for detecting the phase difference between an input complex value and a known complex value when different complex values are allocated for different pilots, and a subtractor (not shown) for obtaining the difference between the phases calculated from the received complex values of two pilots.

The mean calculator 220 averages a plurality of pilot pairs of the phase differences output by the phase difference detector 240 for an i-th symbol period.

A general OFDM system uses a plurality of pilots, and can obtain a more reliable value by averaging the pilots.

The normalizer 222 normalizes the mean calculated by the mean calculator 220 by dividing it into reference values. The reference value is set to be the magnitude of a phase change ($N/2\pi$) generated between two pilots when an FFT window offset is one sample.

The normalized phase variation output by the normalizer 222 is divided into an integer part and a fraction part by a round-off calculator 224 and a subtractor 226, and expressed by the following Equation 3:

$$\hat{T}_1 = \gamma[\hat{T}_1] + \{\hat{T}_1 - \gamma[\hat{T}_1]\} = \text{(integer part)} + \text{(fraction part)} \qquad (3)$$

wherein, $\gamma[\hat{\tau}_1]$ is a round-off function, and the fraction part is between ±0.5.

Figure 3:
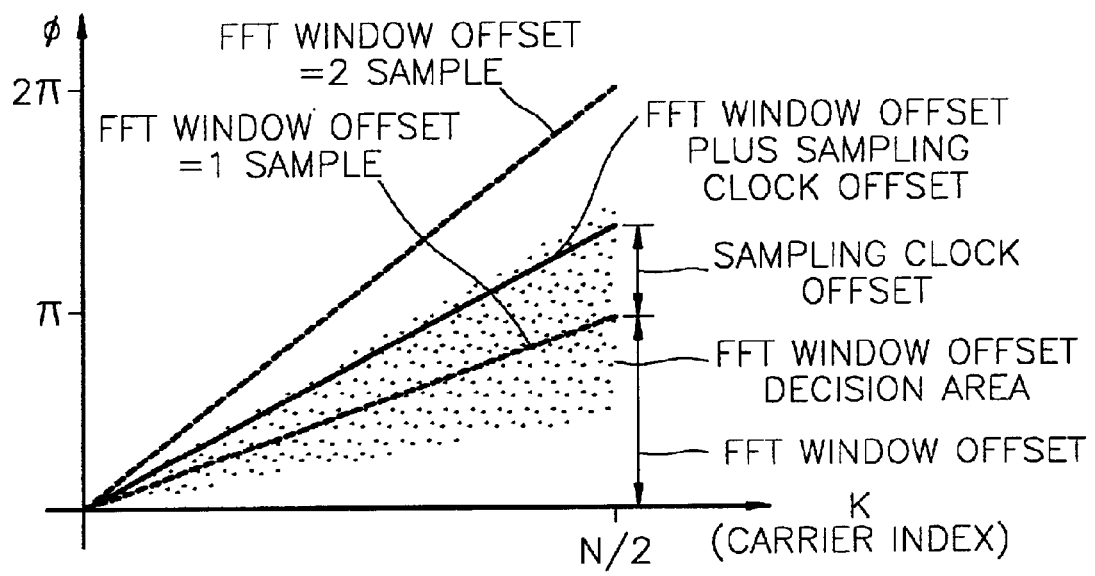
FIG. 3 is a conceptual view showing the division of time synchronization into an FFT window offset and a sampling clock offset by using the round-off calculator 224 and the subtractor 226 of FIG. 2.

FIG. 3 is a conceptual view showing a division of time synchronization into an FFT window offset and a sampling clock offset by using the integer part and fraction part.

As shown in FIG. 3, the slope of a phase variation is affected by both the FFT window offset and the sampling clock offset. That is, when the FFT window offset is one sample, the slope of an actual phase variation is changed for each symbol on the axis of the slope of a phase variation with respect to an FFT window offset of one sample within an FFT window offset decision area.

The FFT window 212 is controlled by an integer value output by the round-off calculator 224 because the FFT window offset is estimated in sample units.

The FFT window controller 228 receives the integer value output by the round-off calculator 224 and corrects FFT window position recovery errors of the FFT window 120.

The sampling clock offset of the ADC 210 is controlled to be within ±0.5. The PLL 230 receives a fraction value output by the subtractor 226 and controls the sampling clock offset of the ADC 210.

Consequently, the phase variation value output by the normalizer 222 simultaneously controls the FFT window via the round-off calculator 224 and the FFT window controller 228 and the sampling clock of the ADC 210 via the subtractor 226 and the PLL 230.

Figure 4A:
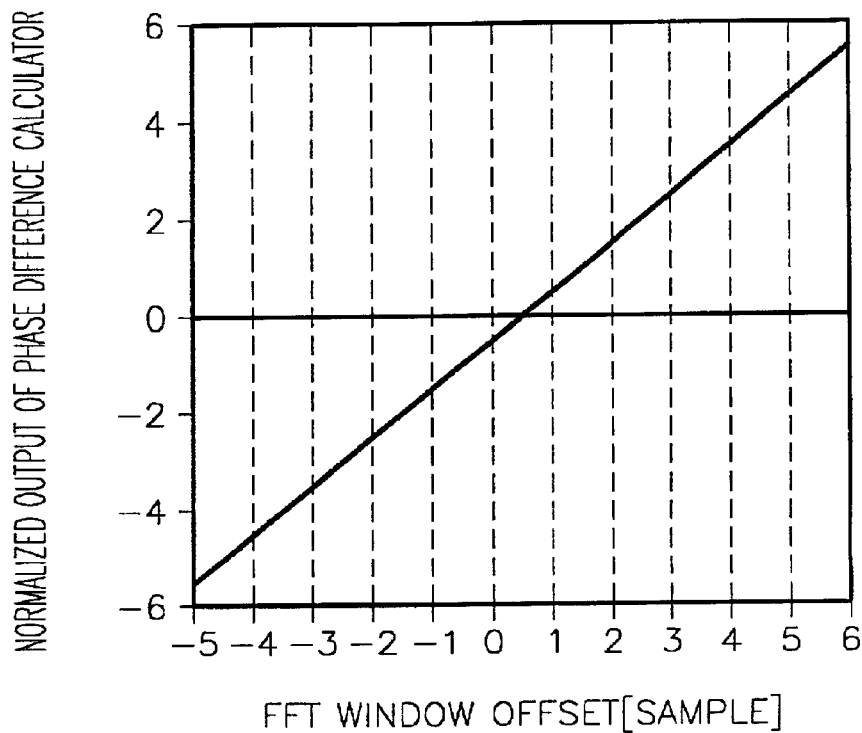
FIG. 4A is a graph showing outputs of the phase difference calculator vs. FFT window offsets, according to the present invention.

FIG. 4A is a graph showing outputs of the phase difference calculator 240 vs. FFT window offsets, according to the present invention. FIG. 4A shows normalized mean phase differences between two pilots output by the normalizer 222 when the FFT window offset is within ±5 samples.

Figure 4B:
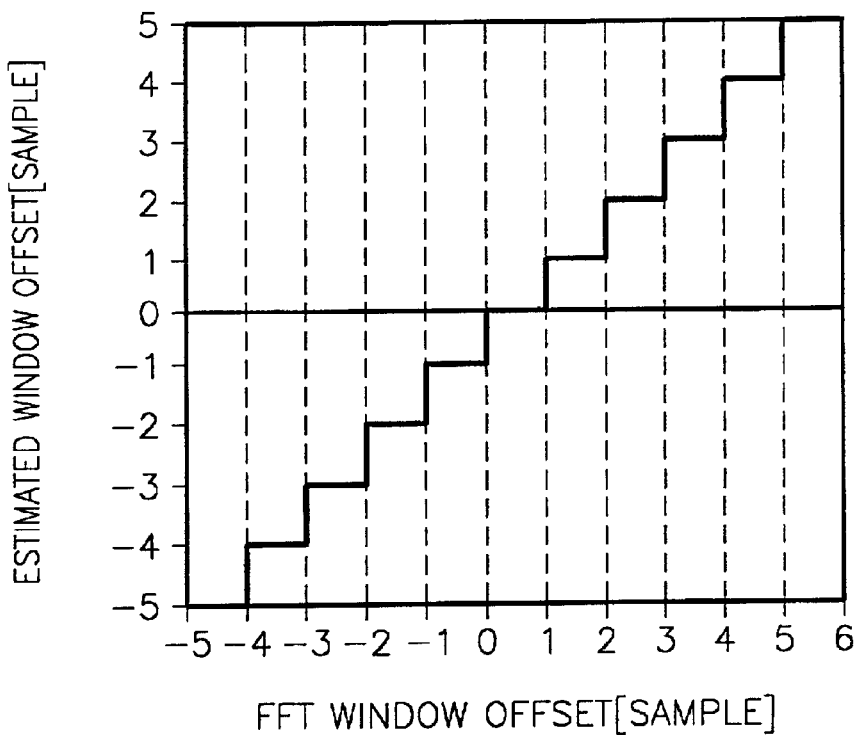
FIG. 4B is a graph showing inputs of the FFT window controller vs. FFT window offsets, according to the present invention.

FIG. 4B is a graph showing inputs of the FFT window controller 228 vs. FFT window offsets, according to the present invention. FIG. 4B shows values of FIG. 4A which have passed through the round-off calculator 224, and accurately predicts FFT window errors with respect to the FFT window offsets.

Figure 4C:
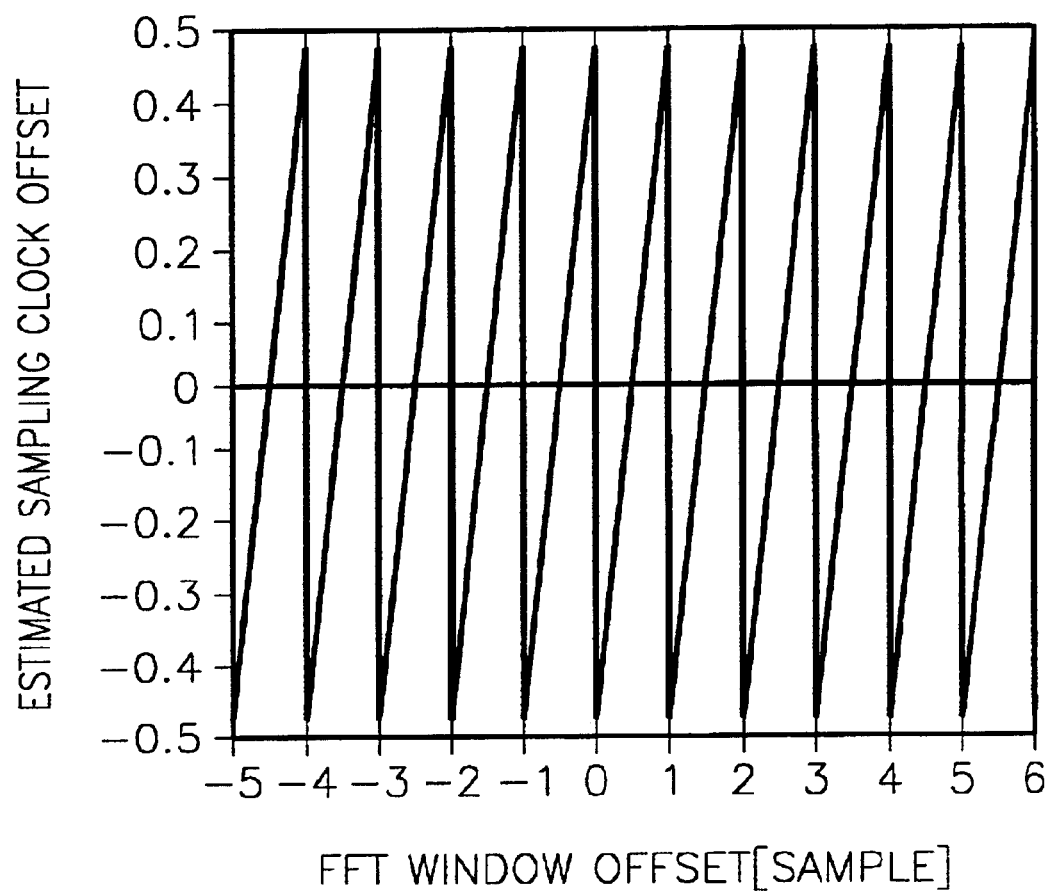
FIG. 4C is a graph showing inputs of the PLL for controlling sampling clock signals vs. FFT window offsets, according to the present invention.

FIG. 4C is a graph showing inputs of the PLL 230 for controlling sampling clock signals vs. FFT window offsets, according to the present invention. FIG. 4C shows the difference between the input and output values of the round-off calculator 224 output by the subtractor 226, representing an accurate characteristics curve which is not affected by the FFT window offset when the FFT window offset is within ±5 samples.

Although the invention has been described with reference to a particular embodiment, it will be apparent to one of ordinary skill in the art that modifications of the described embodiment may be made without departing from the spirit and scope of the invention.

According to the present invention as described above, FFT window position recovery is carried out without being affected by sampling clock errors, and simultaneously sampling clocks are controlled without being affected by FFT window position recovery errors. Therefore, causes of an unstable system are removed, and a synchronization time can be shortened by the simultaneous operations of the two functions.

What is claimed is:

1. A method of interlocking FFT window position recovery with sampling clock control in symbol units in an orthogonal frequency division multiplexing (OFDM) receiver for receiving an OFDM symbol consisting of a useful data interval and a guard interval, the method comprising the steps of:

(a) extracting a pilot signal from fast-Fourier-transformed OFDM received signals, and detecting inter-pilot phase differences;

(b) averaging phase differences detected in step (a) for a symbol to generate a mean phase difference value and normalizing the mean phase difference by dividing the mean phase difference value into reference values corresponding to phase differences generated when FFT window errors of at least one sample exist, thereby to generate a normalized value; and (c) simultaneously controlling the FFT window position offset using a value obtained by rounding off the normalized value of the step (b), and the sampling clock offset using the difference between the round-off value and the normalized value.

2. The method of interlocking FFT window position recovery with sampling clock control in an OFDM receiver as claimed in claim 1, wherein the FFT window position offsets are controlled by integer values, and the sampling clock offsets are controlled by fraction values.

3. An OFDM receiver for interlocking FFT window position recovery with sampling clock control by receiving an OFDM symbol consisting of a useful data interval and a guard interval, the apparatus comprising:

an analog-to-digital converter (ADC) for converting an OFDM signal into digital complex samples;

an FFT window for removing the guard interval from the digital complex samples output by the ADC and outputting useful data samples;

an FFT for fast-Fourier-transforming the samples output by the FFT window;

a phase difference calculator for calculating phase differences between two values among the complex values received via a plurality of pilots from the FFT, averaging the phase differences for one symbol to generate a mean phase difference value, and normalizing the mean phase difference value by dividing the mean phase difference value into predetermined reference values;

an FFT window controller for rounding off the normalized value output by the phase difference calculator and controlling the window position of the FFT window; and a phase synchronous loop for controlling the sampling clock signals of the ADC using the difference between the round-off value and the normalized value.

4. The OFDM receiver for interlocking FFT window position recovery with sampling clock control as claimed in claim 3, wherein the phase difference calculator comprises:

a phase difference detector for detecting the phase differences between two pilots among the received complex values of the pilots output by the FFF;

a mean calculator for averaging the phase differences detected by the phase detector for one symbol and generating the mean phase difference value; and a normalizer for normalizing the mean value obtained by the mean calculator by dividing the mean phase difference value into reference values corresponding to phase differences generated when an FFb window error of one sample exists.

5. The OFDM receiver for interlocking FFT window position recovery with sampling clock control as claimed in claim 4, wherein the phase difference of the phase difference detector is set to be $$\frac{\Delta\phi_{i,k_{n+1,n}}}{k_{n+1} - k_n},$$

$k_{n+1} - k_n$ is a frequency spacing between two pilot carriers, and $\Delta\phi_{i,k_{n+1,n}}$ is an inter-pilot phase difference for an i-th symbol.

6. The OFDM receiver for interlocking FFT window position recovery with sampling clock control as claimed in claim 4, wherein the mean value of the mean calculator is set to be $$\frac{1}{L}\sum_{n=1}^{L}\frac{\Delta\phi_{i,k_{n+1,n}}}{k_{n+1} - k_n},$$

and L represents the number of used pilots.

7. The OFDM receiver for interlocking FFT window position recovery with sampling clock control as claimed in claim 4, wherein the normalization of the normalizer is carried out by multiplying $$\frac{1}{2\pi \cdot N}$$

by the mean value, wherein N is the number of useful data samples.

8. The method of interlocking FFT window position recovery with sampling clock control in an OFDM receiver as claimed in claim 1, wherein the averaging the phase differences detected in step (a) for the symbol to generate the means phase difference value comprises $$\frac{1}{L}\sum_{n=1}^{L}\frac{\Delta\phi_{i,k_{n+1,n}}}{k_{n+1} - k_n},$$

wherein $k_{n+1} - k_n$ is a frequency spacing between two pilot carriers, $\Delta\phi_{i,k_{n+1,n}}$ is the inter-pilot phase difference for an i-th symbol, and L represents the number of used pilots.

* * * * *